United States Patent
Mullowney, Jr. et al.

(10) Patent No.: US 9,440,269 B2
(45) Date of Patent: *Sep. 13, 2016

(54) SYSTEM AND METHOD FOR DISPOSAL OF MUTAGEN WASTE

(71) Applicant: Pharma-Cycle, LLC, Middletown, RI (US)

(72) Inventors: James T. Mullowney, Jr., Newport, RI (US); Theresa L. O'Keefe, Waltham, MA (US)

(73) Assignee: Pharma-Cycle, LLC, Middletown, RI (US)

(*) Notice: Subject to any disclaimer, the term of this patent is extended or adjusted under 35 U.S.C. 154(b) by 0 days.

This patent is subject to a terminal disclaimer.

(21) Appl. No.: 14/451,582

(22) Filed: Aug. 5, 2014

(65) Prior Publication Data

US 2014/0343343 A1 Nov. 20, 2014

Related U.S. Application Data

(63) Continuation of application No. 13/726,468, filed on Dec. 24, 2012, now Pat. No. 9,242,282, and a continuation-in-part of application No. 12/431,355, filed on Apr. 28, 2009, now Pat. No. 8,336,129.

(Continued)

(51) Int. Cl.
| | |
|---|---|
| A62D 3/35 | (2007.01) |
| B09B 3/00 | (2006.01) |
| A47K 11/00 | (2006.01) |
| A47K 11/03 | (2006.01) |

(52) U.S. Cl.
CPC ............. B09B 3/0033 (2013.01); A47K 11/00 (2013.01); A47K 11/035 (2013.01); A62D 3/35 (2013.01); B09B 3/0025 (2013.01); B09B 3/0075 (2013.01)

(58) Field of Classification Search
CPC combination set(s) only.
See application file for complete search history.

(56) References Cited

U.S. PATENT DOCUMENTS

| | | | |
|---|---|---|---|
| 1,949,246 A | 2/1934 | Duner | ............................... 4/420 |
| 2,868,753 A | 1/1959 | Morgan et al. | ............... 260/29.6 |

(Continued)

FOREIGN PATENT DOCUMENTS

| | | | | |
|---|---|---|---|---|
| DE | 3601357 A1 | 7/1987 | ............... | A62D 3/00 |
| DE | 3642859 A1 | 6/1988 | ............... | A62D 3/00 |

(Continued)

OTHER PUBLICATIONS

International Searching Authority—US Authorized Officer: Choi, Hyun Goo, International Search Report—International Application No. PCT/US2012/071590, dated Apr. 22, 2013, together with the Written Opinion of the International Searching Authority, 12 pages.

(Continued)

*Primary Examiner* — John Kreck
(74) *Attorney, Agent, or Firm* — Sunstein Kann Murphy & Timbers LLP (57) ABSTRACT

Waste containing a cytotoxic chemotherapy drug is collected in a container and contacted with a solidification material to form a solidified waste. The solidification material includes a mixture of an organic polymer and a Portland cement clinker. The organic polymer facilitating dispersal of the Portland cement clinker upon contacting said waste with the solidification material, wherein a volume of the solidified waste forms a stable matrix. The solidified waste is sealed within the container.

24 Claims, 10 Drawing Sheets

Related U.S. Application Data (60) Provisional application No. 61/598,317, filed on Feb. 13, 2012, provisional application No. 61/048,382, filed on Apr. 28, 2008, provisional application No. 61/199,720, filed on Nov. 19, 2008.

(56) References Cited

U.S. PATENT DOCUMENTS

| | | | | |
|---|---|---|---|---|
| 3,023,425 | A | | 3/1962 | Illo .................................. 4/469 |
| 3,688,742 | A | | 9/1972 | McGee ............................ 119/1 |
| 4,152,788 | A | | 5/1979 | Gomes .................................. 4/6 |
| 4,424,148 | A | | 1/1984 | Rosenstiel et al. ........... 252/628 |
| 4,432,666 | A | | 2/1984 | Frey et al. ..................... 405/129 |
| 4,437,430 | A | | 3/1984 | DeBardeleben .................. 119/1 |
| 4,615,810 | A | * | 10/1986 | Conner ................. C02F 11/008 210/764 |
| 4,756,273 | A | | 7/1988 | Yananton .......................... 199/1 |
| 5,181,628 | A | | 1/1993 | Okezie .......................... 220/404 |
| 5,224,595 | A | | 7/1993 | Sugimoto et al. ............ 206/321 |
| 5,284,621 | A | * | 2/1994 | Kaufman ................ A61L 11/00 206/524.6 |
| 5,391,351 | A | * | 2/1995 | Kaufman ................ A61L 11/00 206/219 |
| 5,481,061 | A | | 1/1996 | Funabashi et al. ............... 588/4 |
| 5,976,244 | A | | 11/1999 | Mallow ......................... 106/813 |
| 6,180,023 | B1 | | 1/2001 | Amer ............................. 252/175 |
| 6,240,576 | B1 | | 6/2001 | Cosby ............................... 4/483 |
| 6,317,900 | B1 | | 11/2001 | Braxton ........................... 4/483 |
| 6,797,857 | B2 | * | 9/2004 | Tanhehco ................ B01J 20/26 134/116 |
| 6,802,085 | B2 | | 10/2004 | Catanescu et al. ............... 4/471 |
| 7,150,050 | B2 | | 12/2006 | Sharp ................................ 4/484 |
| 7,311,207 | B2 | | 12/2007 | Mallett et al. ................ 209/702 |
| 8,336,129 | B2 | | 12/2012 | Mullowney ...................... 4/479 |
| 9,242,282 | B2 | | 1/2016 | Mullowney et al. | |
| 2003/0115665 | A1 | | 6/2003 | Braxton ........................... 4/483 |
| 2004/0144682 | A1 | | 7/2004 | Altmayer ................... 206/524.7 |
| 2005/0114993 | A1 | | 6/2005 | Schaaf .............................. 4/449 |
| 2008/0083061 | A1 | | 4/2008 | Dubiel ............................. 4/484 |
| 2008/0256696 | A1 | | 10/2008 | Walsmley ........................ 4/420 |
| 2008/0263756 | A1 | | 10/2008 | Marsden .......................... 4/239 |
| 2009/0265845 | A1 | | 10/2009 | Mullowney ...................... 4/479 |
| 2011/0144409 | A1 | | 6/2011 | Neal ............................. 588/252 |

FOREIGN PATENT DOCUMENTS

| | | | |
|---|---|---|---|
| JP | 06-254000 | 9/1994 | ............. A47K 11/04 |
| JP | 2002/051939 | 2/2002 | ............. A47K 11/06 |
| JP | 2005/081003 | 3/2005 | ............. A47K 11/00 |
| JP | 2010/125384 | 6/2010 | ............. C02F 11/00 |
| WO | WO 92/15536 A1 | 9/1992 | ............. C04B 18/00 |

OTHER PUBLICATIONS

European Patent Office, Extended European Search Report—Application No. 12868721.7-1354, dated Apr. 15, 2015, 8 pages.

\* cited by examiner

Legend

◯ Organic Polymer   • Toxic Chemicals

◉ Inorganic Polymer   ▦ Liquid

SYSTEM AND METHOD FOR DISPOSAL OF MUTAGEN WASTE

CROSS-REFERENCE TO RELATED APPLICATIONS

This application is a Continuation of U.S. patent application Ser. No. 13/726,468, filed Dec. 24, 2012, which claims priority to U.S. Provisional Patent Application 61/598,317, filed Feb. 13, 2012.

U.S. patent application Ser. No. 13/726,468 is a continuation-in-part of U.S. patent application Ser. No. 12/431,355, filed Apr. 28, 2009, which in turn claims priority from U.S. Provisional Patent Application No. 61/048,382 filed Apr. 28, 2008 and U.S. Provisional Patent Application No. 61/199,720 filed Nov. 19, 2008.

Each of the above-described applications is hereby incorporated herein by reference in its entirety.

TECHNICAL FIELD

The present invention relates to a system and method for disposal of mutagen waste, and more particularly to disposal of human waste contaminated with pharmaceuticals.

BACKGROUND ART

Human waste from a person undergoing chemotherapy typically includes toxic chemicals that are carcinogenic. According to various estimates, about 20 to 98 percent of the administered chemotherapy drugs pass through the human body. As it is possible that even trace amounts of active cytotoxic drugs have the ability to cause miscarriages, birth defects, cancer, immunologic diseases and other environmentally triggered diseases, it is critical that health care workers, other caretakers and family members are protected from the contaminated wastes and any surfaces that may be contaminated with them.

Furthermore, when the bodily fluids are disposed of conventionally through the septic system and/or sewage treatment plant, several cytotoxic drugs are known to survive wastewater treatment and drinking water purification intact. Most current incineration technologies are not able to effectively eliminate the chemical materials so the dangerous chemicals may become airborne. As the bodily fluids are complex liquid waste, it is difficult and costly to safely transport the contaminated materials to facilities.

More advanced methodologies for disposing of such waste include transporting the waste to a facility at which the toxic chemicals are removed from the waste and recycled or disposed of in a environmentally safe manner. However, this conventional approach is complex and not cost efficient.

SUMMARY OF THE INVENTION

Embodiments of the invention provide an assembly and method for processing human waste that generally contains pathogens, carcinogens, mutanagenics and/or terotogenics.

In an embodiment of the invention, a method for collecting the mutagen waste is provided, the method including placing a support in relation to a rim of a toilet and affixing a rigid waste container to an opening of the base to form a waste-collecting assembly. The support may be placed on or below the rim of a toilet, and may include a side surface congruent with and corresponding to an inner surface of a bowl of a toilet. In addition or alternatively, the reservoir may include a flange protruding outwardly from a body of the reservoir above the support.

The method may further comprise accumulating human waste in the rigid reservoir and depositing a solidification material in said reservoir to solidify the waste. The waste may include at least one of a pharmaceutical agent, a mutagen, a carcinogenic, a toxin, a teratogen, a chemotherapy chemical, and other hazardous materials. In addition or alternatively, the method may include depositing a pathogen killing material in the reservoir, where the pathogen killing material may be at least one of an acidic material, an alkaline material, a neutral material, lime, sodium hydroxide, calcium hydroxide, calcium carbonate, sodium sulfate, and sodium carbonate. Furthermore, the accumulated waste may be sealed within the container, e.g., with a lid and additional adhesives, and transported to a collecting facility.

In accordance with another embodiment of the invention, a method of processing human waste is presented. The method includes a step of providing a portable toilet for accumulation of human waste. The portable toilet may be used by a patient who has been treated with a pharmaceutical agent. The method further includes a step of accumulating human waste in said toilet; depositing solidification material in said toilet prior to or after the waste is accumulated in said toilet; and transporting said toilet with solidified waste to a collection facility, which in a specific embodiment may be a landfill. The method may further include providing a pathogen killing material and depositing the pathogen killing material in the toilet.

According to a related embodiment, a waste-collecting assembly for disposing human waste is disclosed for use in conjunction with a toilet. The waste-collecting assembly includes a base having an aperture there through and dimensioned to be disposed in relation to a rim of the toilet. In various embodiments, the base may have a side peripheral surface congruent to an inner surface of a bowl of the toilet and be disposed below or on the rim of a toilet. The side peripheral surface may be circumferential, and the aperture may be located in a substantially central portion of the base.

The assembly may further include a waste reservoir for receiving and accumulating human waste, the reservoir coupled to the base, having an input opening, and dimensioned to be disposed within the aperture through the base. At least one of the base and the reservoir may be rigid.

The base may include a curvilinear surface defining a downward slope from a peripheral portion of the base towards the aperture. In addition or alternatively, the base may include a planar surface between a peripheral portion of the base and the aperture. In a specific embodiment, the base and the reservoir may form an integral and inseparable unit, e.g., co-molded together or, alternatively, molded as a single piece. The aperture through the base and the reservoir may include mating surfaces.

In addition, the assembly may include a sealing mechanism (or seal) sealing the waste accumulated within the container to prevent the waste from leaking out. In a related embodiment, the seal may be formed between the reservoir and a lid coupled to the reservoir. In a particular embodiment, the seal may be formed by mating threads.

In a related embodiment, the reservoir may include a generally tapered surface that facilitates guiding the waste being collected to the opening of the reservoir. Such a circumferential surface may be elevated with respect to the edge of the opening of the reservoir. In a specific embodiment, the container may include a flange protruding outwardly from a body of the reservoir above the base. The flange may be circumferential and have an outer rim that is elevated with respect to the input opening of the reservoir.

The assembly may further include means for solidifying the human waste accumulated in the reservoir and means for killing pathogens in the accumulated human waste.

Another related embodiment provides a disposable waste containment apparatus comprising an inseparable unit that includes a container, the container having a flange extending outwardly from a neck of the bowl container, wherein the flange is adapted for supporting the apparatus on a rim of a toilet bowl and under a toilet seat.

In accordance with another embodiment of the invention, a composition is provided that includes a mixture of organic and inorganic polymers that together provides for safe encapsulation of liquid matter. The liquid matter may include, without limitation, human waste contaminated with dangerous chemical(s) such as cytotoxic drugs. When the mixture is combined with the liquid matter to form a combined material, the organic polymer facilitates dispersal of the inorganic polymer through-out the combined material. Thus, no mechanical mixing need be performed. Upon dispersal, the inorganic polymer forms a stable matrix and covalently links with the dangerous chemical. Any water in the waste is used as a chemical reagent in the reaction and is no longer present.

In accordance with related embodiments of the invention, the mixture may be formed into a pellet. The pellet may include a dissolvable material, such as plastic. The pellet may consist of only the organic polymer and the inorganic polymer. The pellet may be formed by heating the mixture of the organic and inorganic polymers so that the organic polymer at least partially denatures without being destroyed. For example, the heated mixture may be sprayed to form droplets that upon cooling condense into pellets.

In accordance with further related embodiments of the invention, a method of preparing a coated container for use in encapsulating a liquid material includes heating the composition. The composition is then sprayed on a surface of the container, the heated composition upon cooling forming a coating on the surface, whereby the liquid material is added to the container to form the combined material.

In accordance with another embodiment of the invention, a method for using a mixture of an organic polymer combined with an inorganic polymer is provided. When the mixture is combined with a liquid material, such as a human bodily fluid that is contaminated with dangerous chemicals, a multi-step process will automatically occur that sequester the dangers. Due to the combination of polymers, the multi-step process will occur without any mechanical mixing or stirring, as the organic polymer facilitates dispersal of the inorganic polymer through-out the combined material.

In accordance with related embodiments of the invention, the liquid material may include a pharmaceutical agent, a mutagen, a carcinogenic, a toxin, a chemotherapy chemical, and/or other hazardous materials. In addition or alternatively, the method may include depositing a pathogen killing material in the reservoir, where the pathogen killing material may be at least one of an acidic material, an alkaline material, a neutral material, lime, sodium hydroxide, calcium hydroxide, calcium carbonate, sodium sulfate, and sodium carbonate. Furthermore, the reacted polymers with the accumulated waste may be sealed within a container, e.g., with a lid and additional adhesives, and transported to a collecting facility.

In further related embodiments of the invention, the combination of the two types of polymers may be packaged into a tube of dissolvable polymer so the mixture of polymers can be safely manufactured, transported and handled without the reactions initiating until desired such as when placed in contact with human bodily waste. The dissolvable polymer may be plant or animal based such as corn starch or may be any synthetic or semi-synthetic polymer that retains its structure until mixed with sufficient water or similar liquid to trigger dissolution.

In still further related embodiments of the invention, the method may include pelleting the combination of the organic and inorganic polymers in a dissolvable plastic(s) or similar dissolvable material to create pellets that can be safely manufactured, transported and handled without the reactions initiating until desired such as when placed in contact with human bodily waste. The pellets may be composed of only the organic and inorganic polymers. The pellets may be created by mixing and then heating the two types of polymers to a temperature that would cause the organic polymer to temporarily denature. The heated mixture may be sprayed as large droplets, causing the combined polymers to cool and condense into pellets. The heated mixture may also be sprayed against a surface, such as the interior wall of the container that will later be used to collect waste, to form a coating. The surface may be sprayed to a depth for a desired dry volume.

In yet further related embodiments of the invention, the pellets (or other forms of the organic and inorganic polymer mixture) may be used to sequester liquid spills on surfaces or within tubes or vessels by placing the pellet within or on the spill and once the reaction is complete, remove the stable matrix formed by the organic and inorganic polymers for transport and disposal. The pellets may be contained within a semi-permeable bag that can be laid on or over or within a surface or tube contaminated with or by a dangerous liquid spill. In this embodiment, the reagents will absorb the contaminated liquid from the surface, covalently crosslinking the dangerous chemicals within the matrix while constrained by the bag. Once the liquid is absorbed, the bag can be transferred to another container for the completion of the reaction. Additional water or water and detergent mixtures may be added to the surface that contained the spill so that when layered with a second semi-permeable bag containing the above described combination of polymers, the added water and detergent mixtures can be extracted while also removing residual contamination. The bags may also have reinforcing straps to assist in lifting.

In another embodiment, the pellets may be added to a container that is used to collect liquid waste for multiple days. In this embodiment, after the waste is transferred to the container from one or more plumbing units, the weight of the waste may be determined and the amount of pellets needed to create the desired safety is added. The pellets may be added manually or automatically. The reaction would progress immediately, creating a stable matrix. The process may be repeated until the container is full. After completion of the reaction, the formerly dangerous waste is safe for transportation and disposal.

BRIEF DESCRIPTION OF THE DRAWINGS

The foregoing features of the invention will be more readily understood by reference to the following detailed description, taken with reference to the accompanying drawings, in which:

FIGS. 2(A, B) illustrates a container (reservoir) and a cover lid for the reservoir, used in collecting human waste, in accordance with an embodiment of the invention. More particularly.

FIGS. 4(A, B) illustrate side views of embodiments of the assembly installed within a toilet bowl.

FIGS. 6(A-D) illustrate an embodiment of a waste collecting assembly molded as an inseparable unit.

FIGS. 8(A-C) shows an embodiment of the invention adapted to operate as a leased unit and including a removable waste-collecting chamber sealable upon use. More particularly.

FIGS. 10(A-D) illustrate various states when using organic polymer to mix inorganic polymer through-out liquid waste contaminated with toxic chemicals, in accordance with an embodiment of the invention.

DETAILED DESCRIPTION OF SPECIFIC EMBODIMENTS

Illustrative embodiments of the invention present a method and a system for safely collecting and disposing human waste from a patient treated with a dangerous pharmaceutical that advantageously prevents damage to the environment and other people. Various embodiments of the invention include a composition that includes an organic polymer and an inorganic polymer, that when combined with, for example, human waste including a dangerous pharmaceutical and water, causes a non-mechanical mixing that effectively disperses the dry inorganic polymer throughout the human waste. Once all the liquid is absorbed by the organic polymer, the dry inorganic polymer will slowly extract the water from the organic polymer and use it in a chemical reaction that covalently bonds the dangerous pharmaceuticals to the inorganic polymer and forms a stable matrix, without the need for mechanical mixing of the inorganic polymer with the hazardous chemical materials. Avoiding mechanical mixing is critical when working with such dangerous pharmaceuticals because it allows people without training to create an ideal chemical detoxification reaction without dangerous maneuvers that could contaminate other surfaces or create spills. The resulting matrix may be safely lifted and transported for disposal. Details are discussed below.

Figure 1:
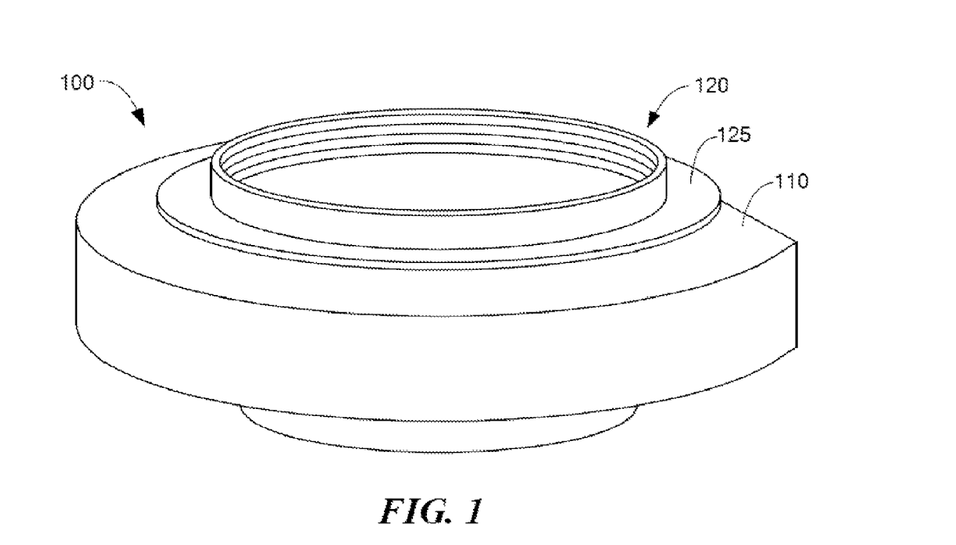
FIG. 1 shows an assembly for collecting human waste, in accordance with an embodiment of the invention.

FIG. 1 shows a waste-collecting assembly 100, for use in conjunction with a toilet, for collecting and processing pathogenic excreta, in accordance with an embodiment of the invention. The assembly 100 may include a supporting base (also referred to hereinafter as plate) 110, a container 120, which is a waste reservoir supported by the base 110, and a container lid (not shown) that enables a sealed closure for the toxic contents of the container 120 prior to processing. In various embodiments, the base 110 and the container 120 may be fabricated as one element or, alternatively, inseparably integrated with one another.

The container 120 may be substantially rigid. In other embodiments, the container 120 may be flexible, such as, e.g., a bag made of plastic. For the purposes of this disclosure, the rigidity of the container 120 is defined as the container's ability to maintain its shape as a freestanding unit, i.e. without a support, whether the container 120 is empty or has some contents in it. A rigid container 120 is contrasted with a plastic packet or bag, the shape and form of which is generally defined by its contents. In other embodiments, the supporting base 110 is also rigid and resistant to changing its shape under the load of the waste reservoir 120 filled with the waste. The use of various flexible trash-collecting containers may increase the overall cost-efficiency of the trash-collecting process. Such flexible containers are well known in the art and, therefore, may present an obvious choice for collecting the human carcinogenic waste. On the other hand, a rigid container used in the present invention may lend itself to easily shaking the contents of the contained to facilitate the mixing of the solidifying agents and the collected waste, as described below. In addition or alternatively to the solidifying components, agents may be added to the waste that chemically neutralize, de-activate, or detoxify the carcinogens contained in the waste. Moreover, a rigid embodiment of the container 120 is inherently more safe and leak-proof in comparison with the flexible container, which may rip.

In operation, the supporting base 110 may be placed in relation to a rim of the toilet. For example, the base 110 may be installed below the rim of a bowl of the toilet, and further fitted with the container. Alternatively, the container 120 may be attached to the supporting base 110 prior to placement in the toilet. Thereafter, the toilet is used by the patient. After the waste has been accumulated within the container, the lid is applied to seal the contents within the container for further processing.

Figure 2A:
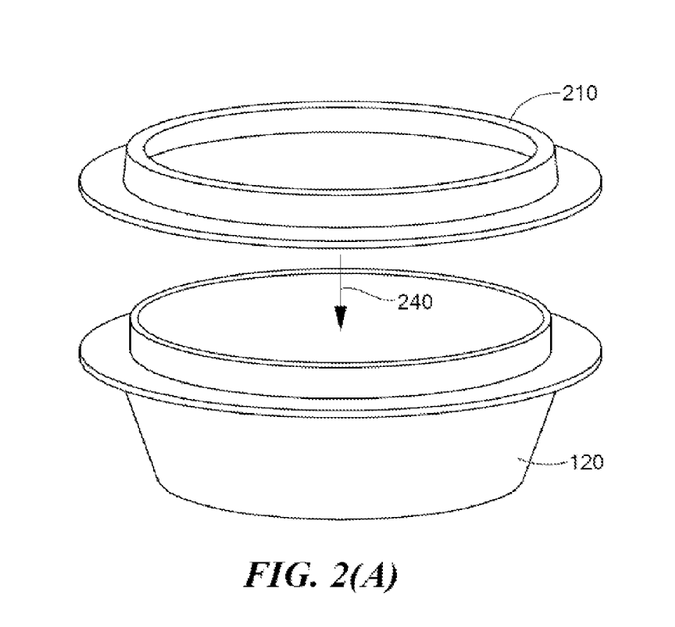
FIG. 2(A) shows a perspective view.
Figure 2B:
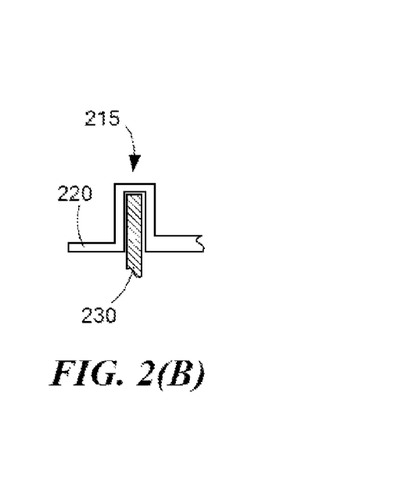
FIG. 2(B) shows in more detail a retention seal between the container and the cover lid, in accordance with an embodiment of the invention.

An example of the container 120 and a lid 210 is shown in FIGS. 2(A, B), in accordance with an embodiment of the invention. FIG. 2(A) shows a perspective view. In FIG. 2(B), an embodiment of a retention seal 215 is shown that is formed by snap-fitting a peripheral structure 220 of the lid 210 onto a peripheral element 230 of the upper wall of the container 120, as shown by an arrow 240. Generally, however, any retention seal known in the art may be used. In some embodiments, for example, a seal between the lid and the container may be formed by thread fitting of the lid onto the container. An embodiment of a seal may also have a built-in sealing redundancy provided by multiple sub-seal arrangements, such as micro-bead surfaces or multiple contact arrangements as known in the art. In an embodiment utilizing a flexible container 120 such as a plastic bag, a lid 210 may not be required. In such a case, the sealing of waste and reactive agent mix contents of the flexible container may be provided using other methods known in the arts, for example by zip-locking or by providing a foldable base 110, which, upon collapsing, closes upon itself and seals the flexible container 120.

Figure 3:
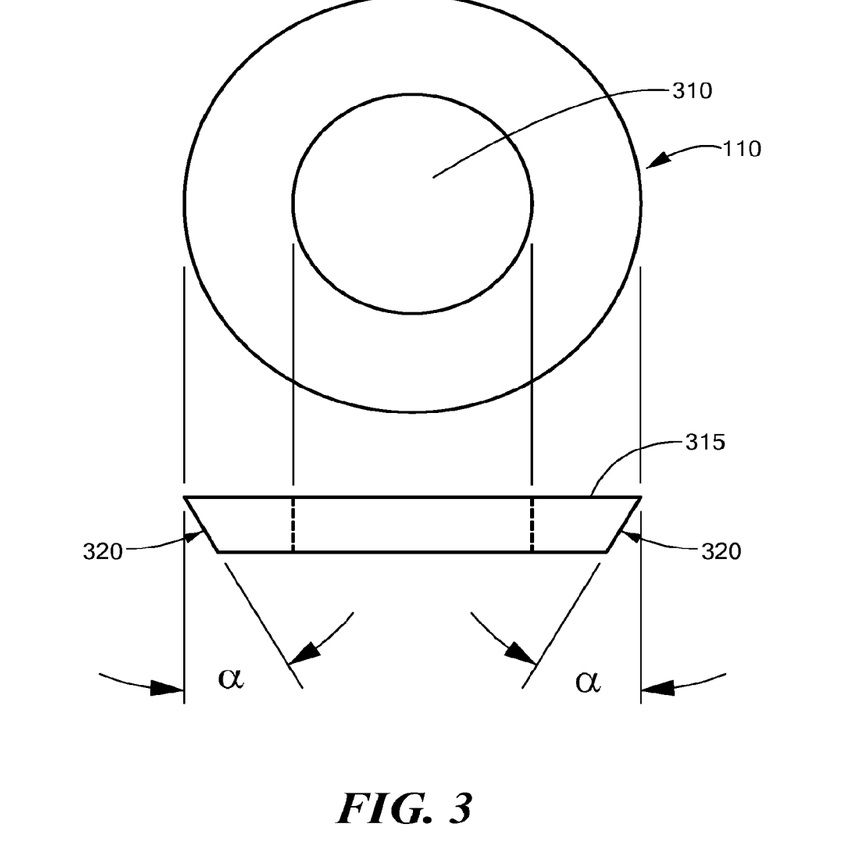
FIG. 3 shows an exemplary embodiment of a base used in one embodiment of the assembly, in accordance with an embodiment of the invention.

In various embodiments, the supporting base 110 may include a plate having an opening for fitting the container 120 as shown in FIG. 1. The plate may have a thickness sufficient to support a load defined by the anticipated contents of the container, for example several pounds. A schematic sketch of one embodiment of the supporting plate 110 with a through opening 310 is shown in FIG. 3 in side and top views. The supporting plate 110 may be made, without limitations, from various suitable materials such as plastics or metals. In an embodiment, the side peripheral surface 320 of the supporting base 110 may be slightly curved or sloped with respect to an upper planar surface 315 (as indicated in FIG. 3 by the angle α that may range from a fraction of a degree to tens of degrees). Such a curved or sloped surface 320 may be made congruent with the sloped inner surface of a toilet bowl within which such supporting base is disposed. That the sloped surface is congruent and complementary with the toilet bowl, allows for a close and stable mating interface between the two. In other embodiments, the side peripheral surface of the base can form a right angle with the top and/or bottom surfaces of the base. In related embodiments, an upper surface and/or a lower surface of the supporting base may be generally non-planar.

In further reference to FIGS. 1 and 3, a supporting flange 125, which extends outwardly with respect to the outer surface of the container 120, may have dimensions that are larger than the dimensions of the opening 310 in the supporting base 110. The perimeter of the body of the container 120 and its outer shape, on the other hand, may be appropriately sized to provide for a firm fit within the opening 310. In such a case, the container 120, when inserted into the base opening 310, may be stably kept in its inserted position within the supporting base 110 simply due to a tight fit of the body of the container within the opening 310 and the resting of the flange 125 on the upper surface 315 of the supporting base 110. In this embodiment, both the opening 310 and the container 120 may have any suitable peripheral shape. A generally tapered shape, e.g. slightly conical shape, may be preferred to provide for a tight fit as discussed above.

Figure 4A:
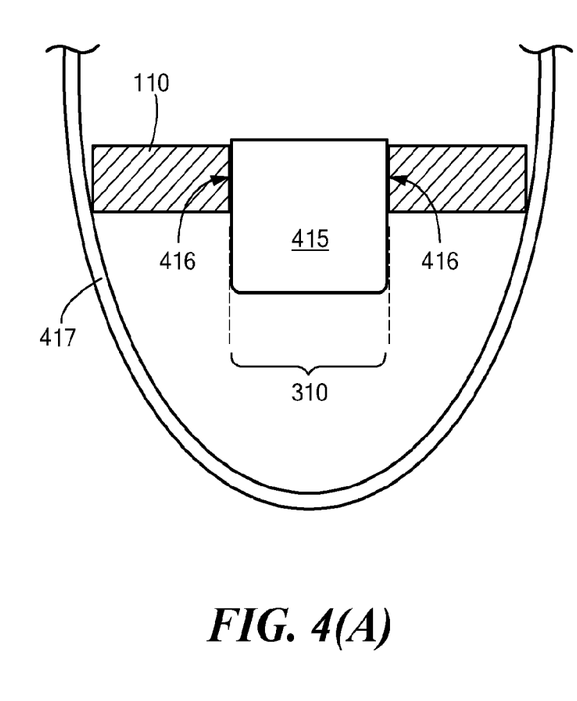
FIG. 4(A) shows an embodiment including a straight supporting base having a flat upper surface and a side peripheral surface disposed at a right angle to the upper surface.
Figure 4B:
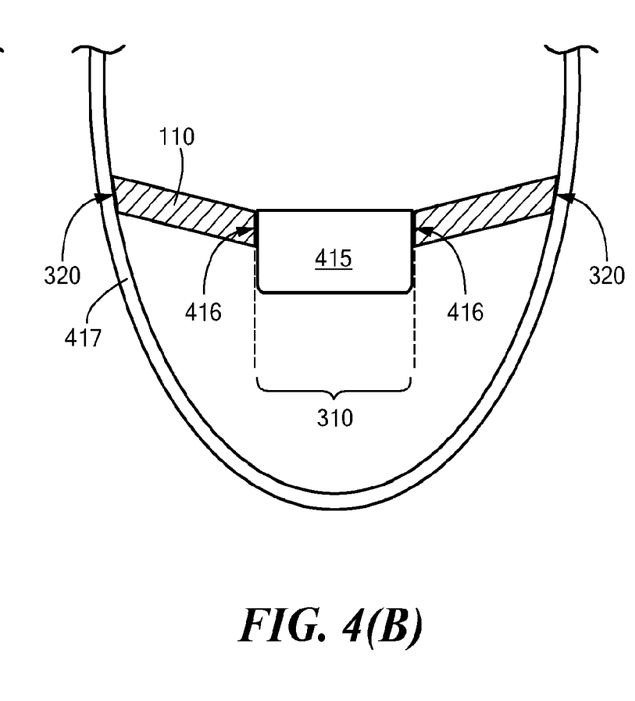
FIG. 4(B) shows an embodiment including a supporting based having an upper surface sloped towards the opening in the base and a curved side peripheral surface.

In another embodiment, shown in FIG. 4(a), the circular opening of the straight supporting base 110 may be provided with an inner thread that is complementary to a thread on the outer surface of the neck of the container 120. In such embodiment, the container may be thread-fitted, 416, to the throughout opening in the supporting base 110, e.g. from below the base 110 prior to installing the base into the toilet bowl 417 in relation to the rim of the toilet (not shown). As illustrated in FIG. 4(a), the base 110 is installed below the rim of the toilet. In a related embodiment, shown in FIG. 4(b), a generally non-planar supporting base 410 curved or sloped side peripheral surface 320 and a non-planar upper surface 420 may be utilized. As shown, the upper surface 420 is downwardly sloped towards the opening 310 in the base 410. The use of such a base 410 may facilitate the collection of waste in the container by guiding the spilled waste (or waste otherwise disposed on the surface 420 outside the opening 310) towards the opening 310 along the curved surface 420. In this embodiment, the lid (or cover) may be fitted as known in the art onto the upper portion of the container. In a specific embodiment, the base 410 may be shaped to have a generally conical surface 420.

Figure 5:
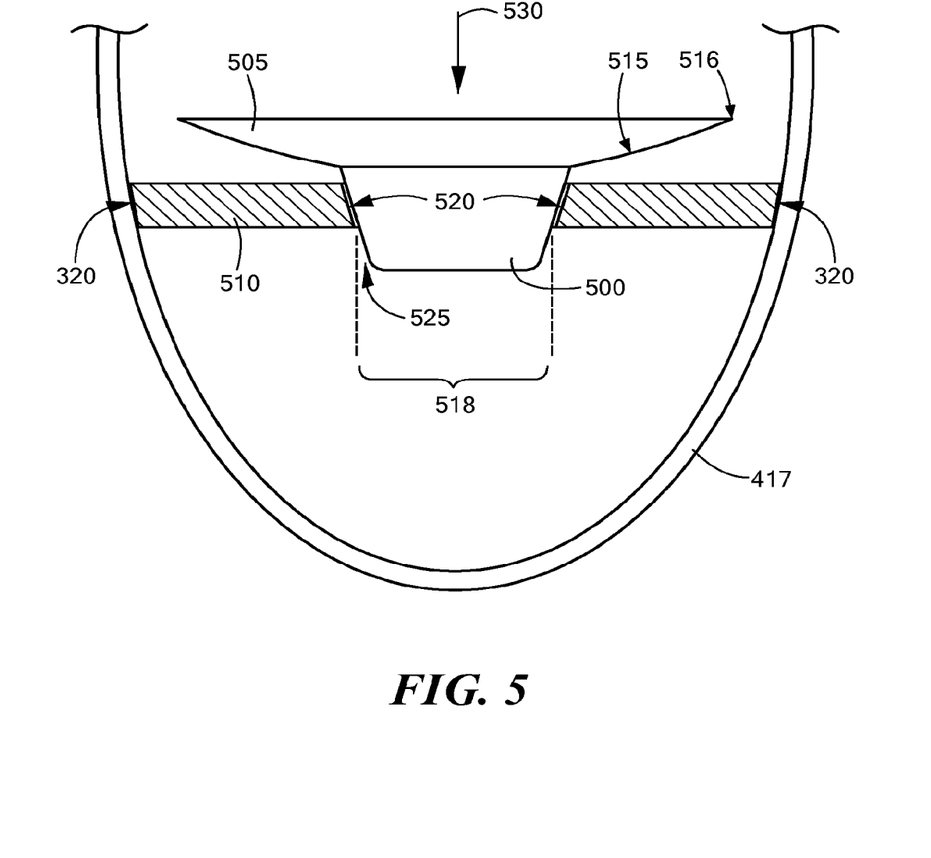
FIG. 5 illustrates a side view of another implementation of the assembly, in accordance with an embodiment of the invention.
Figure 6A:
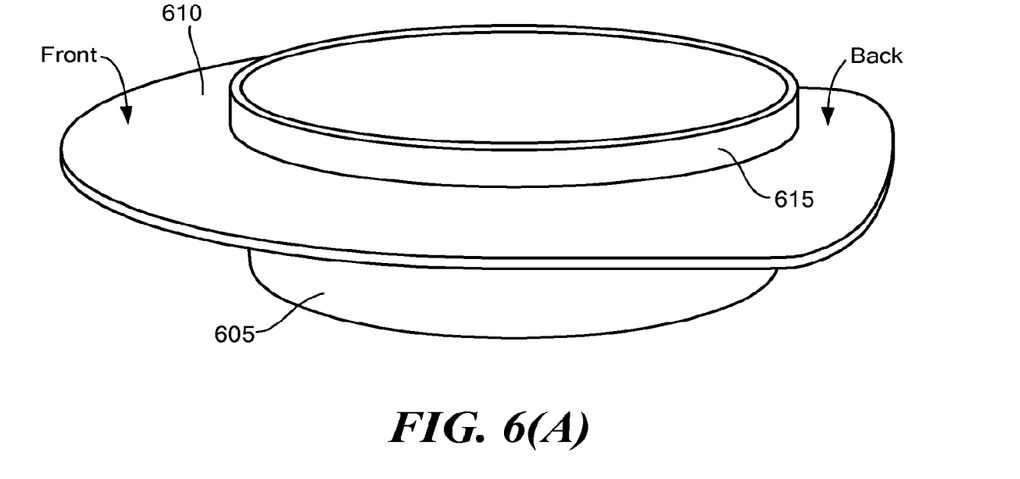
FIG. 6(A) shows a perspective view.
Figure 6B:
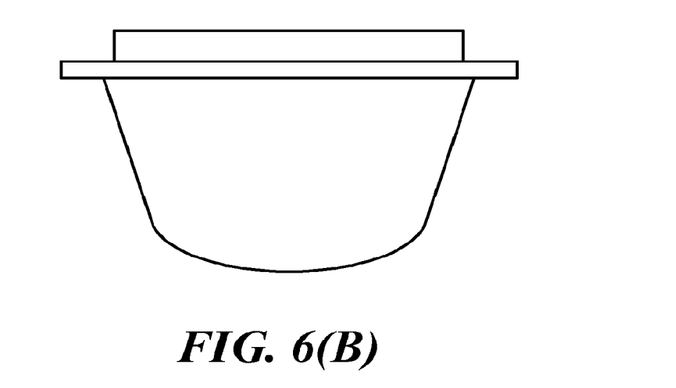
FIG. 6(B) shows a front view.
Figure 6C:
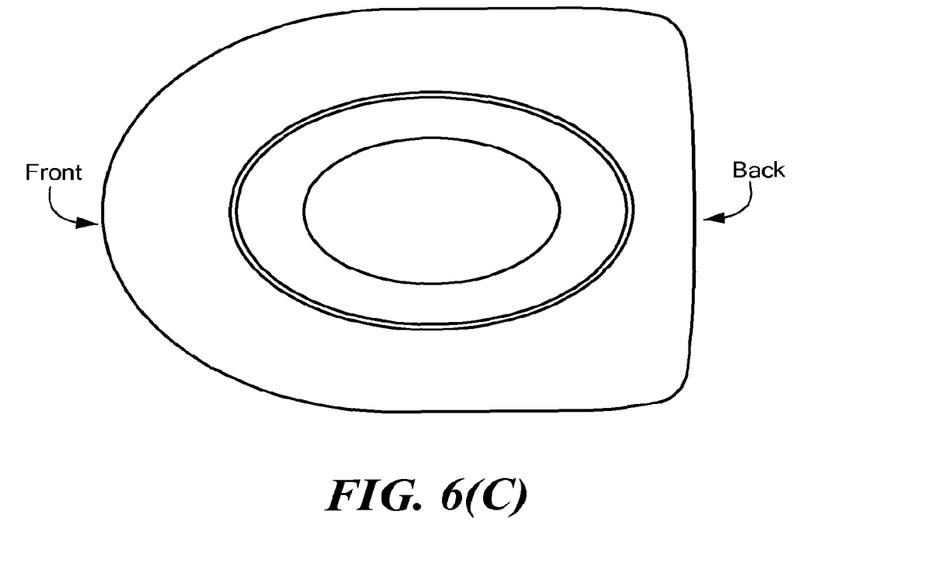
FIG. 6(C) shows a top view.
Figure 6D:
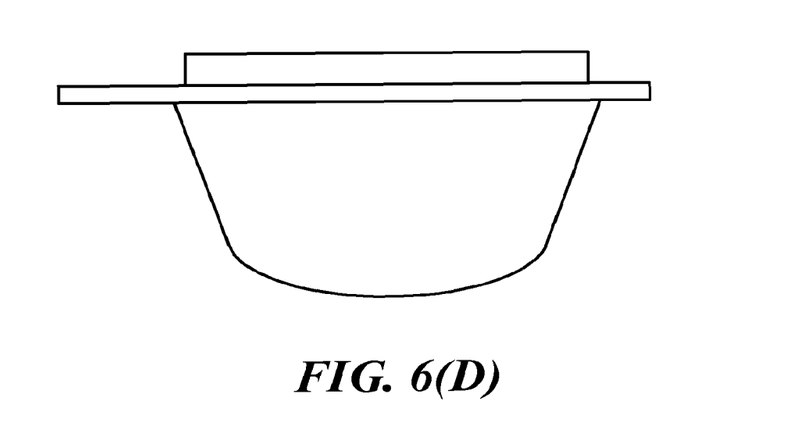
FIG. 6(D) shows a side view.

In another embodiment shown in FIG. 5, the waste-collecting assembly may include a container 500 having a collar or flange 505, extending substantially over the straight supporting base 510 having a sloped side peripheral surface 320. The circumferential flange 505 may have a downward slope 515 extending from the peripheral portion 516 (located around the outskirts of the flange 505) towards the opening 518 of the supporting base 510. The flange 505 generally protects the base from waste spilled outside of and near to the opening 518 and, in addition, guides such waste disposed onto the flange towards the opening 518 along the downward slope 515. As shown, the base 510 additionally has a sloped inner side surface 520 defining the opening 518 through the base 510. As a result, the opening 518 is tapered in the direction of the center of the supporting base 510. The sloped surface 520 is preferably made congruent to a sloped outer (side) surface 525 of the container 500. In various embodiments, the tapered opening 518 and the tapered sloped side surface 525 may be mating, e.g. both surfaces 520 and 525 can be conical surfaces having the same apex angle. Generally, each of the surfaces 520 and 525 extends circumferentially and facilitates a tight fit between the container 500 and the base 510 to assure that penetration of the waste, collected into the container as generally shown by the arrow 530, into the bowl through the opening 518 is minimized. Although in one embodiment a flange 505 may be formatted to be an inseparable part of the container 500, in a related embodiment (not shown), the flange may be releasably attached to the rim of the container's opening, e.g., with the use of thread. In another embodiment, the flange 505 may be fastened to the container 500 in a non-disengageable fashion, known in the art.

Another embodiment of the waste-collecting assembly 600, shown in FIGS. 6(a) through 6(d), includes a reservoir 605 and a flange 610. A lid for closing and sealing the reservoir 605 is not shown. The flange 610 extends outwardly from the body of the reservoir 605 and is wide enough to support the unit on the rim of the toilet bowl under the toilet seat. In operation, such a single waste-collecting unit 600 may be installed onto a rim of the toilet bowl. For example, the assembly 600 may be lowered into the toilet bowl until the appropriately dimensioned flange 610 is firmly rested onto the rim of the bowl and acts as a base supporting the bowl in relation to the rim of the toilet. In a related embodiment, the toilet seat (not shown) which may be hingedly attached to the toilet, may be further lowered onto the flange, which remains sandwiched between the rim and the toilet seat. A collar 615, although shown in FIG. 6, is optional and, if present, is preferably short enough not to protrude above a typical toilet seat when the unit has been installed in the toilet. As a result, the assembly 600, when installed onto the rim of the toilet, preferably does not protrude above the toilet to cause inconvenience to the user of the toilet in operation. A height of the optional collar 615, therefore, may be approximately 1 to 2 inches or less. In related embodiments, the unit 600 may be integral, inseparable into components. For example, the unit 600 can be molded from plastic, whether singly- or multi-layered.

As shown in FIGS. 1 through 6, a body of the reservoir of the waste-collecting assembly may be appropriately shaped to be accommodated by a typical toilet bowl in conjunction with which the assembly may be installed. For example, the body of the container 605 of the unit 600 may be shaped, in different embodiments, to facilitate the unit installation within the bowls of major, most commonly used brands of manufactured toilets produced domestically. In a specific implementation related to the embodiments shown in FIGS. 1 through 6, a container (or reservoir) may be installed into a bowl so as to provide for a clearance (a gap) between a bottom of the container and the nearest lower surface (such as the surface of water) of water in the bowl.

Figure 7:
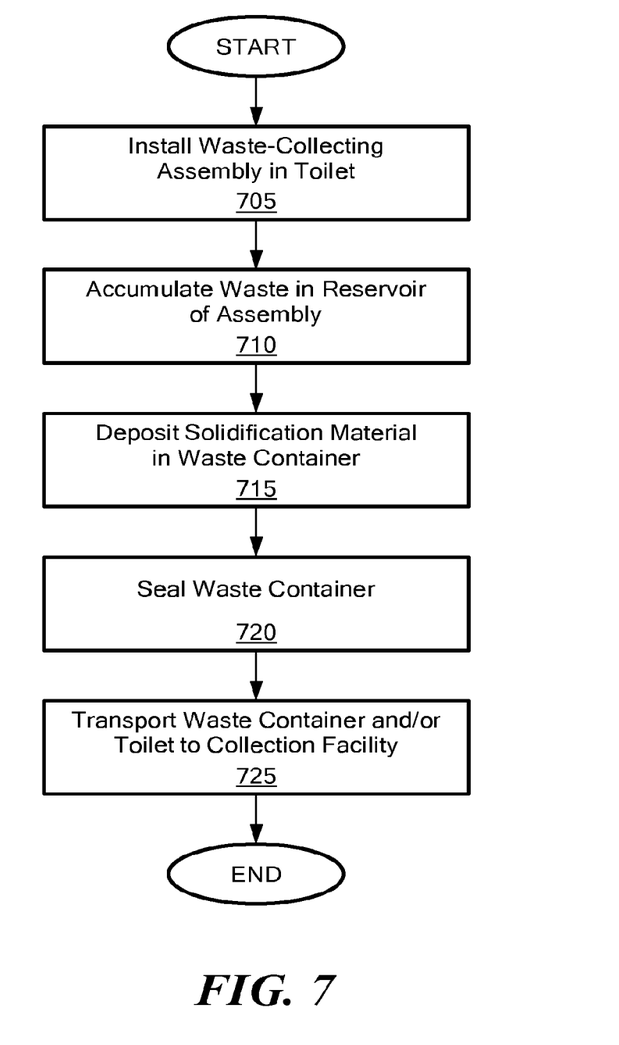
FIG. 7 shows a flow of processing the mutagen human waste, in accordance with an embodiment of the invention.

Processing of human mutagen waste may be generally described as shown in FIG. 7. The process starts at step 705, where an embodiment of a waste-accumulating assembly of the invention is installed in a bowl of a toilet, whether piece by piece or pre-assembled prior to installation. The assembly or an assembly kit, containing the assembly components such as the base, the container, and the lid may be provided, for example, to a hospital or home, where a patient has received treatment with a dangerous agent. The dangerous agent may be, without limitation, a pharmaceutical agent, a mutagen, a carcinogenic, a toxin, a teratogen, a chemotherapy chemical and/or another hazardous materials or drugs such as materials specified by Occupational Safety and Health Administration (OSHA) or National Institute for Occupational Safety and Health (NIOSH).

The waste reservoir of various embodiments of the invention, such as the container 120 of FIG. 2 or the container 605 of FIG. 6, may have various capacity, e.g. the capacity limited by the toilet within which the container is disposed. In a specific embodiment, the container may be a single-use or multi-use container.

Figures 8A, 8B, 8C:
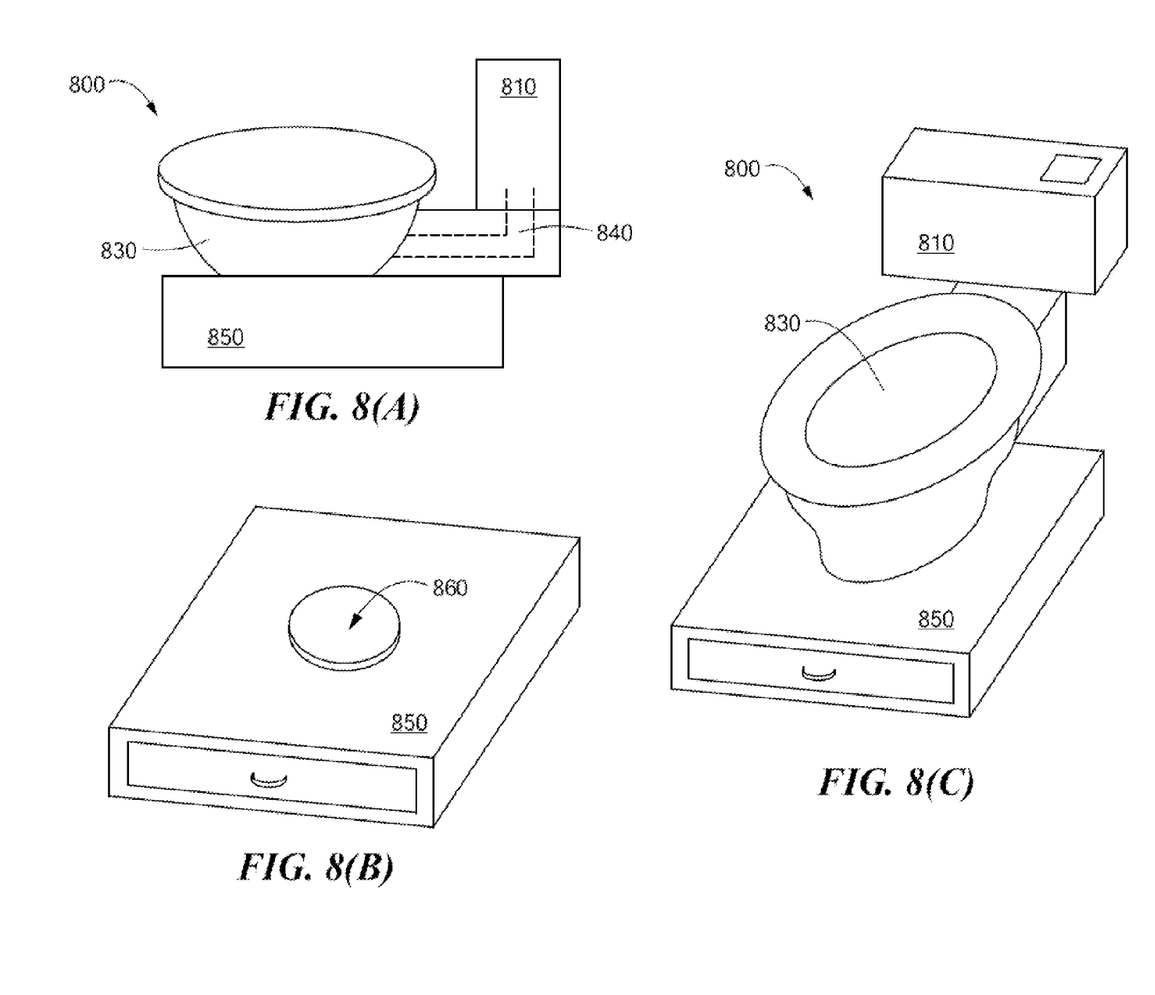
FIG. 8(A) shows a side perspective view of the unit.
FIG. 8(B) shows a removable draw storage and disposal located at the base of the unit.
FIG. 8(C) shows a front perspective view of the unit.

The assembly may be used in conjunction with various toilets known in the art including, without limitation, a portable toilet or a urinal. In one implementation, a portable toilet unit is used in conjunction with an embodiment of the invention may be placed in and fixed at a specified location at the hospital, as a leased unit, for example. Such a fixed unit may have a removable waste-collecting chamber sealable upon use, and the appropriate conduits to provide the unit with agents to be mixed with waste and water. An embodiment of such leased unit 800 is shown in FIGS. 8(A-C). More particularly, FIG. 8(A) shows a side perspective view of the unit. FIG. 8(B) shows a removable draw storage and disposal located at the base of the unit. FIG. 8(C) shows a front perspective view of the unit. As shown, the unit includes a container 810 used in conjunction with a reagent pack that can be replaced or refilled. The reagent from the pack is added to the waste disposed into a bowl 830 of the toilet unit through at least one passage 840 shown in dashed lines. Both the waste and the reagent are further delivered from the bowl 830 to a removable draw storage and disposal 850 located at the base of the unit 800 through the opening 860. In addition, the leased unit may have a reservoir (not shown) dedicated to mixing the reagents and the waste.

Figure 9:
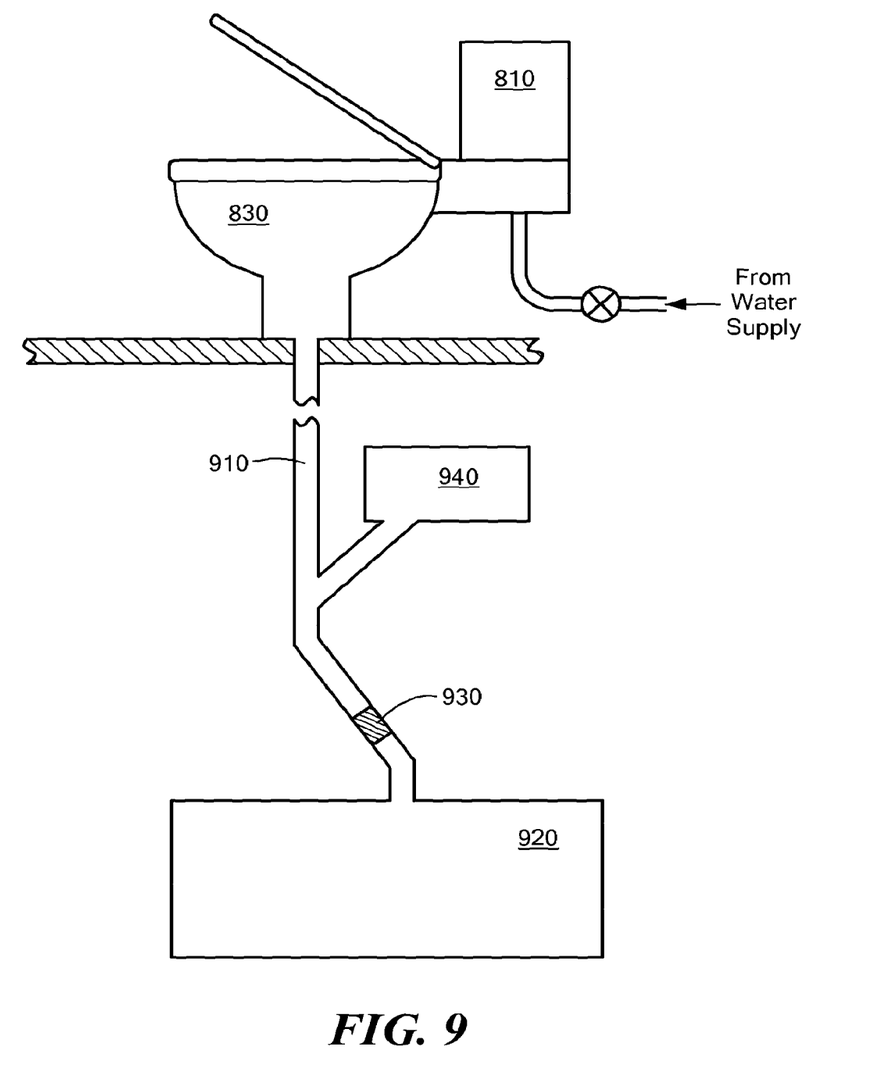
FIG. 9 schematically illustrates an embodiment including a remote waste-collection area.

In another embodiment, shown in FIG. 9, the toilet may be used in conjunction with various plumbing such as pipes or other guides, to allow for release of the mixed material (a mix of waste with reagents) in a collection area that is remote from the toilet, prior to solidification of the mix. This may be beneficial to permanent facilities at hospitals that require a significant amount of waste to be regularly disposed. An example of an remote collection area may be a reusable retaining structure having at least one retaining wall, e.g. a cubic yard box or even a 30 cubic yard rolloff which would be placed outside of a building (e.g., in the ground) and, upon being filled, transported away. In a specific embodiment, the remote collection area may be a storage tank located in basement in the hospital. An embodiment schematically illustrated in FIG. 9 includes a holding tank 810 with reagents and plumbing 910 that guides the carcinogenic waste, reagents, and water from the bowl 830 towards a removable storage tank 920 located in the basement. As shown, the reagent and waste from the toilet pass through a mixing device 930 prior to reaching the storage tank 920. An additional container 940 with reagent and pathogen killing material may be employed.

As mentioned above, the toilet may include a seat for use by a patient. The seat includes a hole through which a patent may secrete waste into the reservoir. The seat may be integral to the toilet, or otherwise adhered to the toilet. In the embodiments of the invention, the assembly may be disposed below the rim of the toilet or, alternatively, on the rim of the toilet so as to have the toilet seat disposed above the assembly. Waste is accumulated in the toilet at step 710. Waste may be, without limitation, mutagen waste.

Upon accumulation of waste in the reservoir, the solidification material is placed on or otherwise mixed with the secreted waste in the container at step 715, causing the waste to solidify. Alternatively, the solidification material may be placed in the container prior to accumulation of the waste, i.e., the reservoir of the assembly installed at step 705 may already contain a solidification material. The solidification material is used to solidify the secreted waste in the reservoir and chemically bind mutagen elements. The solidification material may include, without limitation, cement, clay, kitty litter, vermiculite and/or fly ash. The solidification material may include acidic, alkaline and/or neutral material. The solidification material may be provided in easily managed bags of, without limitation, less than 10 pounds. In various embodiments, the solidification material may be placed in a reservoir included in the toilet that is separate from the reservoir used for the waste. Optionally, the assembly may include a switch or other operator interface, as known in the art, which will permit the solidification material to enter the waste reservoir when desired.

The reservoir containing the solidified waste is then sealed with the lid at step 720. The sealing between the lid and container, accomplished by any of the methods known in the art such as snap-on or interference fitting, may be further reinforced with an appropriate lock and/or adhesive. At least the sealed container and, in some embodiments, the overall assembly, is then transported to a collection facility at step 725. In a preferred embodiment, the entire assembly may be disposable. In an alternative embodiment, the reservoir may be removable, and only the reservoir may be transportable to the collection facility. To initiate transportation of the at least reservoir (or the overall assembly), the patient (or other responsible person to whom the toilet was delivered) may contact an agency responsible for transporting the at least reservoir to the collection facility. The collection facility may be, without limitation, a landfill. The reacted waste is often no longer a US Department of Transportation regulated hazardous material.

A landfill often requires that any waste delivered be pathogen free. To further this end, a pathogen killing material may be provided. The pathogen killing material may include acidic, alkaline and/or neutral materials. The pathogen killing material may include, without limitation, lime, sodium hydroxide, calcium hydroxide, calcium carbonate, sodium sulfate, and/or sodium carbonate. In various embodiments, the solidification material may kill pathogens (such that an additional pathogen killing material is not needed).

The pathogen killing material may be deposited in the toilet before or after the waste is accumulated in said portable toilet, prior to solidification. The pathogen killing material may be added to the waste reservoir, without limitation, prior to using the toilet, after every use of the toilet, and/or just prior to transportation to the collection facility. In various embodiments, pathogen killing material may be included in the waste reservoir upon delivery of the toilet to the patient. The pathogen killing material may be added to the reservoir by, without limitation, the patient (or other responsible person to whom the toilet was delivered), or by the toilet delivery and/or transportation agency. A related embodiment of the invention may include an automatic mixing tool for mixing the agent such as solidifying agent or a pathogen killing material, stored in an auxiliary agent container, with the waste and appropriate means for providing electricity and water for completing the process of neutralization of waste.

An exemplary waste collecting system that may be used by a patient in a home-care situation may include a set of a predetermined number (e.g., twenty-four) of containers such as containers discussed in reference to FIGS. 1 through 6, for single use. The system would also include corresponding twenty-four packages filled with pre-measure amount of reagent as well as a urine-only collection bottle. The system may be delivered to the patient's home using postal services, for example. Having collected the mutagen waste in a container, the patient will mix the reagents as appropriate, add any additional urine from the urine-only collection bottle, seal the container and place it in a provided box. The box may have special lining to contain any overflow. Once all the containers are used up and the box is filled, the waste collection system is sealed and mailed to the collection facility. Alternatively, a pick-up service may be arranged, depending on the nature of the mutagen and possible exposure of other people to it.

An example of processes of solidification and chemical deactivation of the mutagen waste according to one embodiment of the invention is disclosed below. When a solidification material, added to the reservoir of the assembly contains cement, for example, setting and hardening of a cement component is caused by the formation of water-containing compounds (such as urine), forming as a result of reactions between cement components and water. As a result of the reactions (which start immediately upon mixing the solidification material with the waste), a stiffening can be observed which is very small in the beginning, but which increases with time. The hydration products primarily affecting the strength of the solidified waste are calcium silicate hydrates, calcium hydroxide, sulfuric hydrates and related compounds. The simplified reaction may be expressed as:

$$2Ca_3OSiO_4+6H_2O(drugs) \rightarrow 3CaO.2SiO_2.3H_2O(drugs)+3Ca(OH)_2,$$

wherein "drugs" indicate carcinogenic component of water-containing mutagen human waste. Another possible chemical reaction may be expressed as $$2Ca_2SiO_4+4H_2O(drugs) \rightarrow 3CaO.2SiO_2.3H_2O(drugs)+Ca(OH)_2.$$

In the process of solidification of the mix, the alkalinity of the environment for carcinogenic contents, trapped within the pores of the cement-based solidified microstructure (i.e., its pH-value), increases. The increasing alkalinity of the waste-mix neutralizes and kills the bacteria contained in the waste.

In various embodiments of the invention, a composition that includes a combination of an organic and an inorganic polymer may be provided that when used together provides for a combination of reactions that automatically disperse the inorganic polymer throughout the waste volume. Such a process advantageously provides a high level of neutralization of the biologic hazards within the waste as well as the highest level possible of covalent crosslinking of the dangerous chemicals with inorganic polymer. The process also allows for a high level of mixing without mechanical means or the use of other devices. This will advantageously allow patients with only minimum training to safely manage the chemicals that contaminate their bodily fluids after chemotherapy infusions or chemotherapy pills. The combination of the two polymers with distinctly different characteristics creates a safe and complete mixing of the polymers within and through-out human bodily waste contaminated with dangerous chemicals. The composition/process may be used, for example and without limitation, in the above-described waste-collecting systems or in further waste collecting systems described below. The waste may be, without limitation, a liquid material including human bodily waste, urine, feces, vomit and/or sweat.

Organic polymers are used to rapidly absorb liquids from waste products including urine and feces. Typically, the process happens rapidly but it is reversible. If the chemical contained within the waste is dangerous, over time, the organic polymer will release the liquid and with it, the dangerous chemical. In addition, if more liquid than the organic polymer is added to the mixture of polymer with dangerous chemicals, the dangerous chemical may diffuse away from the polymer.

Inorganic polymers can form non-reversible chemically covalent bonds with water and any dangerous chemicals therein contained. In addition, the reaction that results in these chemical bonds can trigger a great increase or decrease in the pH of the solution (pH<3 or pH>9). These very acidic or alkaline environments have the added benefit of destroying biologic pathogens that may be contained within the waste.

Unfortunately, inorganic polymers absorb water slowly and must be thoroughly mixed with the liquid before the cross-linking reaction occurs. If the mixing is not complete through-out the dry reagent, a hard, water impervious shell can form around dry, non-reacted polymer before all the liquid is included. If the liquid is human bodily fluids containing dangerous chemicals, the liquid will still be dangerous to all who may come in contact with it or surfaces contaminated with it.

A reaction using an inorganic polymer to absorb all the liquid and ensure that all dangerous chemical within the waste are accessible to chemical cross-linking entails extensive mixing before the covalent cross-linking reaction starts. Although mechanical mixing can be used, mechanical mixing greatly increases the change for spills or splashes outside of the container, device or surface region of the contaminated waste. In addition, the device used for the mixing will also become contaminated thus increases the amount of dangerous, contaminated material that must be managed.

Figure 10A:
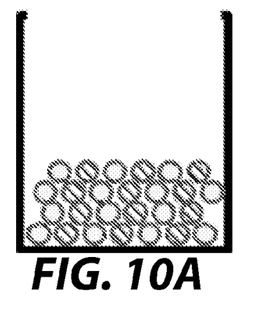
FIG. 10(A) shows a dry mixture of organic and inorganic polymer in a container.
Figure 10B:
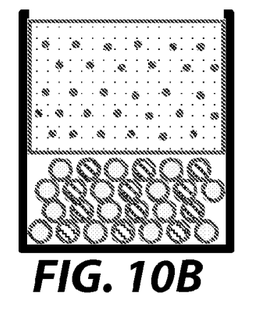
FIG. 10(B) shows liquid material including toxic chemicals added to the container.
Figure 10C:
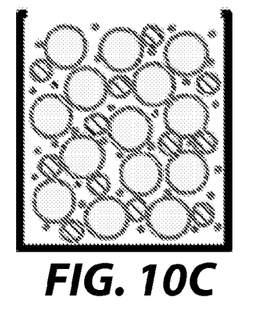
FIG. 10(C) shows the organic polymer absorbing the liquid material, dispersing the inorganic polymer so as to mix the inorganic polymer and toxic chemicals.

In illustrative embodiments of the invention, the unique properties of two types of polymers, one organic and one inorganic, is used to provide complete mixing of the inorganic polymer through-out the liquid material (that includes, for example, dangerous chemicals), while the inorganic polymer is still dry. FIGS. 10 (A-D) illustrate various states when using organic polymer to mix inorganic polymer through-out liquid waste contaminated with toxic chemicals, in accordance with an embodiment of the invention. FIG. 10(A) shows a dry mixture of organic and inorganic polymer in a container. The organic polymer may be, for example and without limitation, sodium polyacrylate, CAS No. 09003-04-7. The inorganic polymer may be, for example and without limitation, Portland cement clinker, CAS No. 65997-15-1. FIG. 10(B) shows liquid material including toxic chemicals added to the container. The mixing process is advantageously provided by the organic polymer. The organic polymer will rapidly absorb any water in the waste, thus pulling any material within the water onto and into the polymer. Because the absorption is so rapid, the water is temporarily sequestered away from the inorganic polymer. As the organic polymer expands with the absorbed water, it will physically push out all materials that surround it in all three dimensions, dispersing the dry inorganic polymer through-out the volume previously occupied by the contaminated waste, as shown in FIG. 10(C).

Figure 10D:
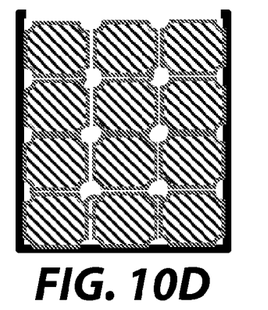
FIG. 10(D) shows the inorganic polymer extracting liquid from the organic polymer, creating a stable matrix that is covalently cross-linked to the toxic chemicals. The water in the waste is used as a reagent in the reaction and is gone.

The inorganic polymer reacts slowly with water but the reaction includes covalent crosslinking of the inorganic polymer and any surrounding chemicals. The reaction consumes the water molecules as part of the process and once it occurs is not reversible. As the reaction with the inorganic polymer progresses, water that was previously absorbed by the organic polymer during the mixing process is slowly withdrawn and consumed as the inorganic polymer undergoes the crosslinking. At the end of the reaction, the entire volume of polymers and wastes is converted into a stable matrix without any residual water or free dangerous chemicals, as shown in FIG. 10(D).

To ease handling during manufacturing, shipping and use, the mixture of dry chemicals may be packaged in dissolvable plastics such as those made of plant, semi-synthetic or synthetic starches. In the simplest form, the mixture may be placed in sealed dissolvable plastic tubing. The tubing may be of a wide range of diameters and the lengths may be easily varied with the end result that the dry material can be more easily aliquoted between different devices and containers depending on the quantity of liquid or liquid containing waste that will be later added. If desirable, the sealed tubing may be glued or otherwise affixed inside the device or other container.

Another option is to pellet the dry organic polymer and inorganic polymer with, for example, plant, semi-synthetic or synthetic starch. This may be done by one of many well-known processes like those commonly used in the food industry that create outer-coatings that dissolve in water but protect more fragile interiors. Once the dry starch coated pellets are completed, they can be used in many circumstances and conditions.

As another method to pellet the dry inorganic polymer with the organic polymer, the mixture of two chemicals may be heated sufficiently that the organic polymer will partially denature without being destroyed. The dry heated mixture may be sprayed in droplets of a set volume so the mixture cools into pellets with a defined composition of dry organic polymer and inorganic polymer. If desired, the spraying may also be directed into containers to which waste will be later added, coating the surfaces to a predefined depth and thus conferring the appropriate volume for the waste to be later added.

In various embodiments, the predetermined ratio of organic to inorganic polymer may be altered to provide the most desired outcome dependent on the waste composition to be added later. The pellets may be dropped into a pipe or container such as a holding tank that contains liquid contaminated with dangerous chemicals. After the reaction is complete, additional liquid can be added and addition pelleted polymer mixture can be added. Again this will react, adsorbing all the liquid, destroying all pathogens and covalently crosslinking and destroying the dangerous chemicals. The process may be repeated until the container is full. If desired, the ratio of contaminated liquid to added pelleted polymer mixture may be determined by weight of the container at each step or by volume within the container at each step.

In various embodiments, the pelleted polymer mixture may be used within a permeable but non-dissolvable bag to clean spills on surfaces. The bag may be laid onto the spill such that the organic polymer absorbs the liquid and the dangerous chemicals. The bag may then be removed and the covalent cross-linking reaction allowed to progress. For additional cleaning, a solution of water and detergent may be sprayed on the surface and a second bag containing the pelleted polymer mixture laid on top. This process could be repeated until the surface is completely cleaned. In addition to flat surfaces, the bags may be wrapped around surfaces or inserted into containers or tubes for the same results. For ease of use, handles or other carrying straps can be incorporated into the non-permeable bag.

As the pellets can be created such that a certain weight of pellets can neutralize and stabilize a set volume of waste and that set volume of waste will have an average weight, the pellets may also be used in an automated liquid waste management system. In this process, a container may be used to collect liquid waste over a period of time. At the end of the period, the weight of the added waste may be used to determine the weight of pellets to be added. After the reaction has gone to completion and the stable matrix has formed, additional waste may be added to the container and the process repeated. This can continue until the container is full and it can then be safely transported for disposal. The process of automated waste filling, weighing and pellet addition may be conducted by one of many commonly used technologies known in the art, but the described invention makes it possible to safely mix and react liquids that include problem chemicals that maybe dangerous to others. An ideal use of this invention would be to collect the patients' waste from a hospital or other facility to treats patients receiving cytotoxic chemotherapy drugs.

The embodiments of the invention described above are intended to be merely exemplary; numerous variations and modifications will be apparent to those skilled in the art. All such variations and modifications are intended to be within the scope of the present invention.

What is claimed is:

1. A method off processing waste that includes urine, feces and/or vomit, the method comprising:
    collecting the waste in a container, wherein the waste contains a cytotoxic chemotherapy drug;
    contacting said waste with a solidification material to form a solidified waste, the solidification material including a mixture of an organic polymer and a Portland cement clinker, the organic polymer facilitating dispersal of the Portland cement clinker upon contacting said waste with the solidification material, wherein the solidification material destroys the cytotoxic chemotherapy drug, covalently bonds with the cytotoxic chemotherapy drug, and/or forms a stable matrix that includes the cytotoxic chemotherapy drug; and
    sealing the solidified waste within the container.

2. The method of claim 1, wherein said inorganic polymer is in a form of a pellet.

3. The method of claim 1, wherein the solidification material is comprises an acidic material.

4. The method of claim 1, wherein the solidification material comprises an alkaline material selected from the group consisting of lime, sodium hydroxide, calcium hydroxide, calcium carbonate, sodium carbonate, and a combination thereof.

5. The method of claim 3, wherein said contacting with the solidification material results in an acidic pH<3 of the contacted waste and solidification material mixture.

6. The method of claim 4, wherein said contacting with the solidification material results in an alkaline pH>9 of the contacted waste and solidification material mixture.

7. The method of claim 3, wherein said acidic material comprises sodium sulfate.

8. The method of claim 1, wherein the organic polymer is in a form of a pellet.

9. The method of claim 1, wherein said mixture is in a form of a pellet.

10. The method of claim 1, wherein the container is affixed to a waste-collecting assembly, wherein the waste-collecting assembly comprises a base, an aperture, and a reservoir.

11. A method of processing waste that includes urine, feces and/or vomit, the method comprising:
collecting the waste in a container or a reservoir, wherein said waste contains a cytotoxic chemotherapy drug; and
contacting said collected waste with a solidification material to form a solidified waste the solidification material including a mixture of an organic polymer and a Portland cement clinker, the organic polymer facilitating dispersal of the Portland cement clinker upon contacting said waste with the solidification material, wherein the solidification material destroys the cytotoxic chemotherapy drug, covalently bonds with the cytotoxic chemotherapy drug, and/or forms a stable matrix that includes the cytotoxic chemotherapy drug.

12. The method of claim 11, further comprising the step of passing said waste from the container or reservoir to a collection area, wherein the collection area comprises a storage tank.

13. The method of claim 12, wherein a pipe passes said waste from the container or reservoir to the collection area prior to solidification, and said waste is optionally passed through a mixing device before passing into the storage tank.

14. The method of claim 12, wherein the storage tank is a removable storage tank.

15. The method of claim 11, wherein the inorganic polymer is in a form of a pellet.

16. The method of claim 11, wherein the organic polymer is in a form of a pellet.

17. The method of claim 11, wherein the solidification material comprises an alkaline material.

18. The method of claim 17, wherein the alkaline material is selected from the group consisting of lime, sodium hydroxide, calcium hydroxide, calcium carbonate, sodium carbonate, and a combination thereof.

19. The method of claim 11, wherein the solidification material comprises an acidic material.

20. The method of claim 19, wherein said acidic material comprises sodium sulfate.

21. The method of claim 12, wherein said waste is mixed in a mixing device before passing into the storage tank.

22. The method of claim 1, wherein said container is a single use container for collecting urine, feces, or vomit.

23. The method of claim 21, said container having disposed therein a solidification material that forms a solidified waste when contacted with said urine, feces, or vomit.

24. A single-use container for processing urine, feces and/or vomit that contains a cytotoxic chemotherapy drug; said container having disposed therein a solidification material that forms a solidified waste when contacted with said urine, feces, or vomit, the solidification material including a mixture of an organic polymer and a Portland cement clinker, the organic polymer facilitating dispersal of the Portland cement clinker, whereupon contacting said urine, feces, or vomit with the solidification material, the solidification material destroys the cytotoxic chemotherapy drug, covalently bonds with the cytotoxic chemotherapy drug, and/or forms a stable matrix that includes the cytotoxic chemotherapy drug.

* * * * *

UNITED STATES PATENT AND TRADEMARK OFFICE
CERTIFICATE OF CORRECTION

PATENT NO.      : 9,440,269 B2
APPLICATION NO. : 14/451582
DATED           : September 13, 2016
INVENTOR(S)     : Mullowney, Jr. et al.

Page 1 of 1

It is certified that error appears in the above-identified patent and that said Letters Patent is hereby corrected as shown below:

In the Claims

In Column 14, Line 46   replace "A method off processing waste"
                        with    "A method of processing waste"
In Column 14, Line 65   replace "material is comprises an acidic material"
                        with    "material comprises an acidic material"
In Column 16, Line 26   replace "processing urine, feces"
                        with    "processing urine, feces,"

Signed and Sealed this
Twenty-seventh Day of December, 2016

Michelle K. Lee
*Director of the United States Patent and Trademark Office*